US010305774B2

(12) United States Patent
Viox et al.

(10) Patent No.: US 10,305,774 B2
(45) Date of Patent: May 28, 2019

(54) ENHANCED U-VERSE / DSL INTERNET SERVICES

(71) Applicant: AT&T Mobility II LLC, Atlanta, GA (US)

(72) Inventors: Alexander Viox, Atlanta, GA (US); Iftekhar Alam, Atlanta, GA (US); Ming-Ju Ho, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 18 days.

(21) Appl. No.: 15/613,466

(22) Filed: Jun. 5, 2017

(65) Prior Publication Data

US 2018/0351844 A1 Dec. 6, 2018

(51) Int. Cl.
*H04L 12/26* (2006.01)
*H04L 12/24* (2006.01)
(Continued)

(52) U.S. Cl.
CPC .......... *H04L 43/16* (2013.01); *H04L 41/0896* (2013.01); *H04W 24/02* (2013.01); *H04W 24/08* (2013.01); *H04W 28/20* (2013.01)

(58) Field of Classification Search
None
See application file for complete search history.

(56) References Cited

U.S. PATENT DOCUMENTS 5,729,549 A 3/1998 Kostreski et al.
6,771,949 B1 8/2004 Corliss
(Continued)

FOREIGN PATENT DOCUMENTS

| CN | 101572680 A | 11/2009 |
|---|---|---|
| EP | 1198963 | 4/2002 |
| WO | WO 2001/010156 A1 | 2/2001 |

OTHER PUBLICATIONS

Perez-Trufero et al.; "Next generation HTS system using hybrid satellite and terrestrial BB delivery-BATS"; Ka and Broadband Communications Conf.; 2015; 9 pages.
(Continued)

*Primary Examiner* — Alex Skripnikov
(74) *Attorney, Agent, or Firm* — BakerHostetler

(57) ABSTRACT

Disclosed herein are methods, systems, and apparatuses for dynamically enhancing a first network bandwidth with bandwidth available in one or more other networks based on user bandwidth needs and network bandwidth availability. A gateway apparatus is disclosed that may monitor the user desired bandwidth, determine that the desired bandwidth is greater than a first threshold bandwidth (e.g., a first network digital subscriber line (DSL) service bandwidth), activate a connection to a second network (e.g., a Long Term Evolution (LTE) mobility network), derive the second network available bandwidth, and use at least a portion of the second network available bandwidth with the first network bandwidth to provide at least a portion of the desired bandwidth (e.g., improve user Internet speed). Thus, the gateway apparatus may enhance the first network bandwidth only when needed and may avoid negatively impacting the second network by only using the second network connection to transfer data if the second network has bandwidth available.

20 Claims, 12 Drawing Sheets

(51) Int. Cl.
*H04W 24/08* (2009.01)
*H04W 24/02* (2009.01)
*H04W 28/20* (2009.01)

(56) References Cited

U.S. PATENT DOCUMENTS

| | | |
|---|---|---|
| 6,950,876 B2 | 9/2005 | Bright et al. |
| 7,058,424 B2 | 6/2006 | Gadgil et al. |
| 7,346,539 B1 | 3/2008 | Atkinson et al. |
| 7,366,769 B2 | 4/2008 | Kaan et al. |
| 7,522,632 B2 | 4/2009 | La Porta et al. |
| 7,633,896 B2 | 12/2009 | Doshi et al. |
| 7,688,828 B2 | 3/2010 | Chapman et al. |
| 7,697,568 B1 | 4/2010 | Zhang et al. |
| 7,830,864 B2 | 11/2010 | Li |
| 7,840,701 B2 | 11/2010 | Hsu et al. |
| 8,144,694 B2 | 3/2012 | Knasnabish et al. |
| 8,200,212 B2 | 6/2012 | Rappaport et al. |
| 8,284,765 B1 | 10/2012 | Kell et al. |
| 8,600,382 B2 | 12/2013 | Hicks, III |
| 8,942,112 B2 | 1/2015 | Andreasen et al. |
| 2003/0162507 A1 | 8/2003 | Vatt |
| 2003/0212787 A1* | 11/2003 | Qiu ..................... H04L 47/10 709/224 |
| 2013/0010705 A1* | 1/2013 | Jonsson ............ H04W 28/0205 370/329 |
| 2014/0269304 A1 | 9/2014 | Rajkotia et al. |
| 2014/0355536 A1 | 12/2014 | Muley et al. |
| 2015/0016260 A1 | 1/2015 | Chow et al. |
| 2016/0094662 A1* | 3/2016 | Kollu ..................... H04W 48/18 709/224 |
| 2016/0308918 A1 | 10/2016 | Muley et al. |
| 2017/0187639 A1* | 6/2017 | Hodroj ..................... H04L 47/41 |
| 2018/0092095 A1* | 3/2018 | Zeng ..................... H04L 5/0007 |

OTHER PUBLICATIONS

Ophir et al.; "802.11 Over Coax—A Hyrid Coax-Wireless Home Network Using 802.11 Technology"; IEEE Consumer Communications and Networking Conf. 2004; 6 pages.

"What is a "Shotgun" modem? Can I do that?" http://web.archive.org/web/20080719011347/http://modemhelp.net.faqs/shotgun.shtml; ModemHelp.net; one page, Feb. 14, 2017.

Satish Gupta; "Home Gateway"; White Paper; WIPRO Technologies; © 2002; 20 pages.

Agustin-Blas et al.; "Near optimal citywide WiFi network deployment using a hybrid grouping genetic algorithm"; Expert Systems with Applications; vol. 38; 2011; p. 9543-9556.

\* cited by examiner

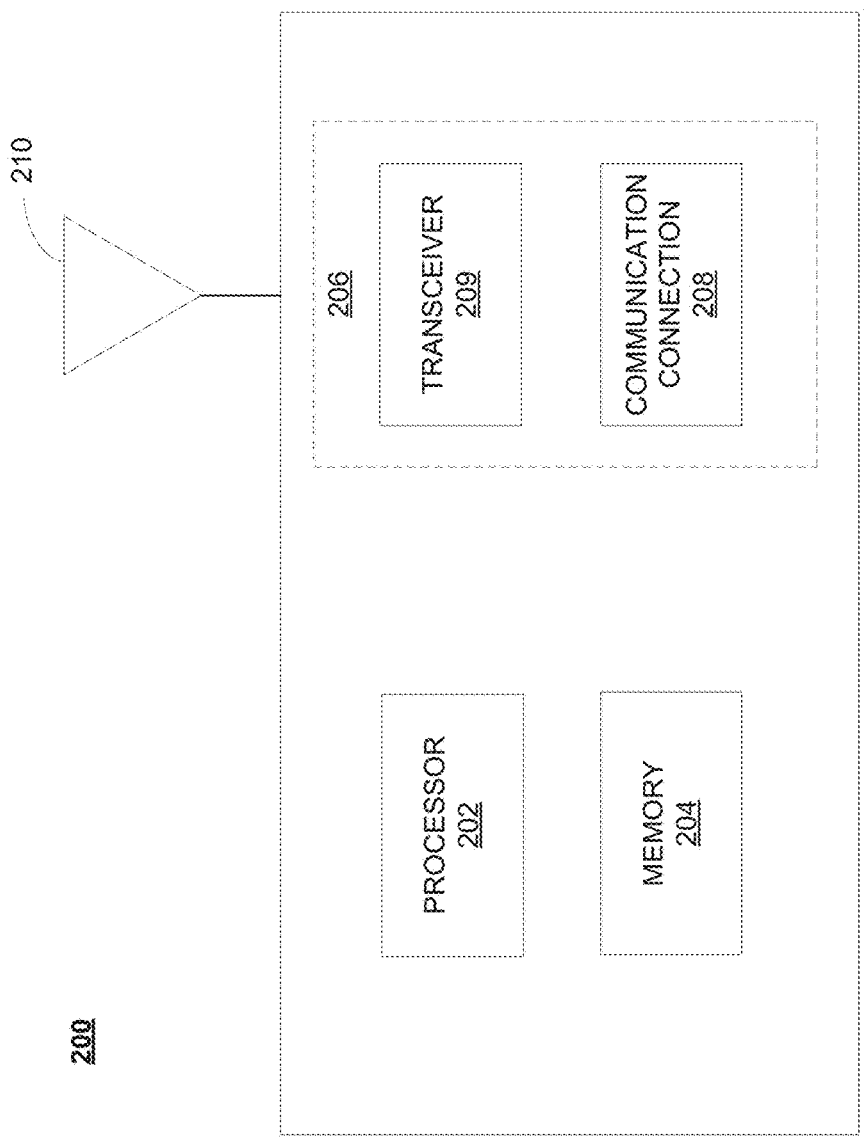

ENHANCED U-VERSE / DSL INTERNET SERVICES

TECHNICAL FIELD

The technical field relates generally to network communication and, more specifically, to methods, systems, and apparatuses for dynamically enhancing a first network bandwidth with bandwidth available in one or more other networks based on user bandwidth needs and network bandwidth availability.

BACKGROUND

Several locations have slow Internet service, with data speeds as low as a few megabits per second (Mbps). For example, Digital Subscriber Line (DSL) services are limited by the distance the residential unit is from the central office and the amount of users utilizing bandwidth on the line. Due to long deployment timelines for cable and fiber-optic cable, as well as, zoning and permit restrictions, there is no quick way to boost the minimum data speed.

SUMMARY

The disclosed methods, systems, and apparatuses may allow for dynamically enhancing a first network bandwidth with bandwidth available in one or more other networks based on user bandwidth needs and network bandwidth availability. For example, a gateway apparatus disclosed herein may dynamically aggregate DSL bandwidth with available mobility network bandwidth to provide the user an improved data speed during high bandwidth consumption scenarios (e.g., gaming, streaming video, downloading large files, or the like).

In an example, a method for dynamically enhancing a first network bandwidth may include monitoring, by an apparatus, a desired bandwidth; determining, by the apparatus, that the desired bandwidth is greater than a first threshold bandwidth; activating, by the apparatus, a connection to a second network; deriving, by the apparatus, a second network available bandwidth; and using, by the apparatus, the first network bandwidth and at least a portion of the second network available bandwidth to provide at least a portion of the desired bandwidth.

In another example, a gateway apparatus may include a processor and a memory coupled with the processor that effectuates operations. The operations may include monitoring a desired bandwidth; determining that the desired bandwidth is greater than a first threshold bandwidth; activating a connection to a second network; deriving a second network available bandwidth; and using the first network bandwidth and at least a portion of the second network available bandwidth to provide at least a portion of the desired bandwidth.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Aspects of the herein described methods, systems, and apparatuses for dynamically enhancing a first network bandwidth with bandwidth available in one or more other networks based on user bandwidth needs and network bandwidth availability are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. When practical, like numbers refer to like elements throughout.

FIG. 2A illustrates a schematic of an exemplary gateway device.

DETAILED DESCRIPTION

Disclosed herein are methods, systems, and apparatuses for dynamically enhancing a first network bandwidth with bandwidth available in one or more other networks based on user bandwidth needs and network bandwidth availability. In an example, a consumer may receive a first network bandwidth (e.g., Internet access speed) via Digital Subscriber Line (DSL) service. Typical DSL service may provide the user a base bandwidth of 1-3 megabits per second (Mbps). In many cases, the base bandwidth may be sufficient for user needs such as web browsing, email, or the like. However, the base bandwidth may not be sufficient to support high bandwidth consumption scenarios (e.g., online gaming, video chat, streaming video, or the like). For example, streaming one channel of high-definition (HD) video may require 6-8 Mbps of bandwidth. Further, given the growing number of devices in homes that connect to the Internet (e.g., laptops, mobile phones, tablets, game consoles, thermostats, TVs, security systems), and that multiple users may desire to simultaneously access the Internet, the base bandwidth may not be sufficient to support user desired bandwidth. A gateway apparatus is disclosed that may monitor the user desired bandwidth (e.g., user's bandwidth consumption). If the gateway apparatus detects the need for increased data speeds (e.g., determine that user's desired bandwidth is greater than the first network bandwidth), the gateway apparatus may activate a connection to a second network (e.g., a Long Term Evolution (LTE) mobility network), and derive the bandwidth available in the second network (e.g., determine the second network capability and available resources). If the second network has available bandwidth, the gateway apparatus may use the first network bandwidth and at least a portion of the second network available bandwidth to provide the user improved Internet access speed. Thus the gateway apparatus may enhance the first network bandwidth only when needed and may avoid negatively impacting the second network by only using the second network connection to transfer data if the second network has available bandwidth. As used herein, bandwidth refers to the amount of data that may be transmitted in a fixed amount of time. Bandwidth may be measured in units of bits per second (bps). Modern network equipment and devices generally support data rates of thousands, millions, or even billions of bps (kilobits per second (Kbps), megabits per second (Mbps), and gigabits per second (Gbps), respectively).

Figure 1A:
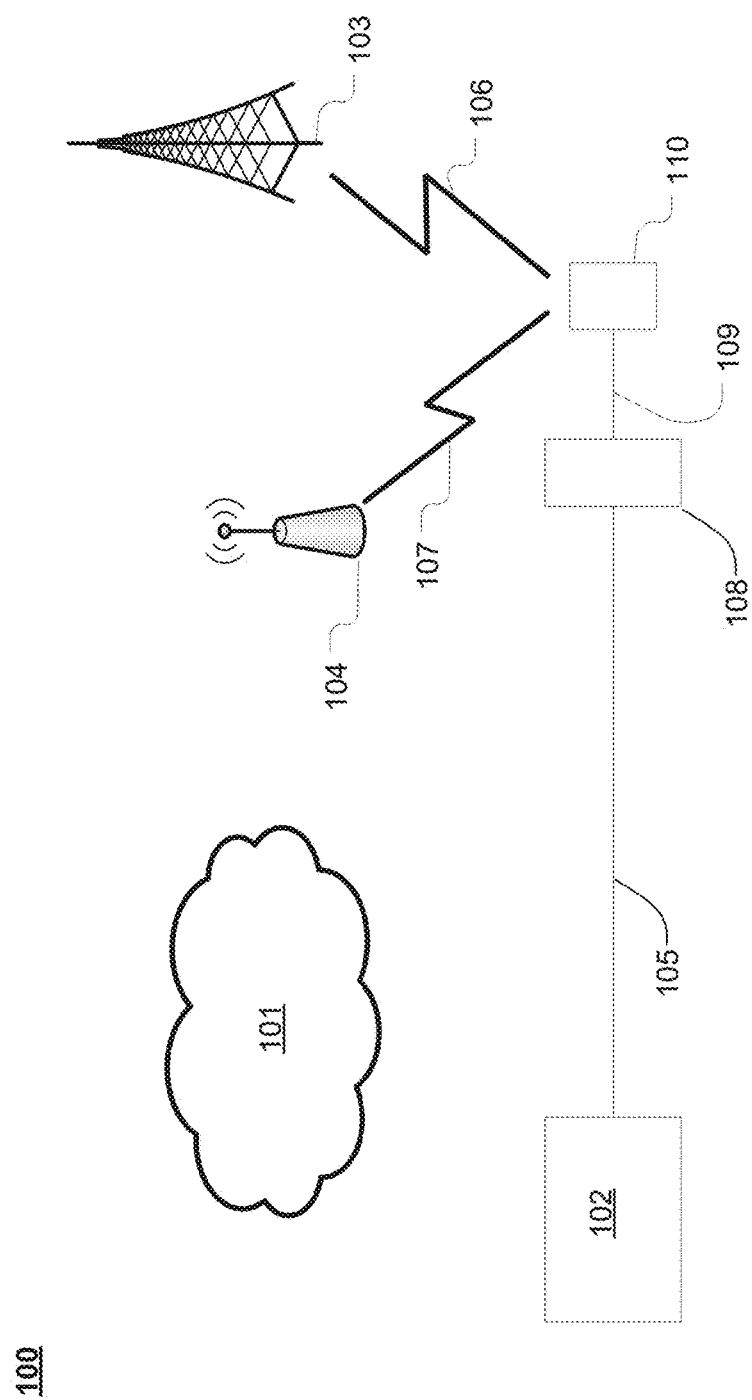
FIG. 1A illustrates an exemplary system according to an aspect of the disclosure.

In an aspect, the gateway apparatus is envisioned to comprise customer premises equipment (CPE) that is located in a user's residence. FIG. 1A illustrates an exemplary system 100 comprising a data network 101 (e.g., Internet), central office (CO) 102, base station 103, wireless access point (WAP) 104, and CPE 110. CO 102, base station 103, and WAP 104 may be independently connected (connections not shown) to data network 101 to create a first network, a second network, and a third network, respectively. In addition, CPE 110 may be independently connected to CO 102, base station 103, and WAP 104, which may allow CPE 110 to gain access to data network 101 via the first network, second network, and third network, respectively. For example, CO 102 may be connected to CPE 110 by a wireline. An exemplary wireline connection may include Digital Subscriber Line (DSL) service. For example, CO 102 may connect to a service area interface (SAI) 108 (e.g., Digital Subscriber Line Access Multiplexer (DSLAM)) via communication link 105 and SAI 108 may connect to CPE 110 by copper line 109. In one scenario, communication link 105 may be a fiber-optic cable. In another scenario, communication link 105 may be a copper line. In another example, copper line 109 may extend from CO 102 to CPE 110. In either example, CPE 110 may include a first network interface for a wireline connection (e.g., communication connection 208 in FIG. 2A) that enables CPE 110 to establish a first network wireline connection with CO 102, thereby gaining access to data network 101 via the first network (e.g., DSL service). The first network wireline connection may provide CPE 110 a first network bandwidth for accessing data network 101. For example, with DSL service, the first network bandwidth may be limited to 1-3 Mbps based on conditions such as the distance from the CO 102 and the number of other users consuming the bandwidth of communication link 105. While the wireline connection has been described herein as a DSL service, the disclosure is applicable to any wired communication network technologies, including coaxial cable and fiber-optic networks.

Continuing with FIG. 1A, base station 103 and WAP 104 may implement radio access technology (RAT) to communicate with CPE 110 over air interfaces 106 and 107, respectively. For example, base station 103 may implement a radio technology such as Evolved Universal Mobile Telecommunications System (UMTS) Terrestrial Radio Access (E-UTRA), which may establish air interface 106 using Long term Evolution (LTE) or LTE-Advanced (LTE-A). CPE 110 may include a second network interface (e.g., transceiver 209 in FIG. 2A) that enables CPE 110 to establish a second network connection with base station 103 by air interface 106, thereby gaining access to data network 101 via the second network (e.g., LTE mobility network). In addition, WAP 104 may implement any suitable RAT for facilitating wireless connectivity in a localized area, such as a place of business, a few city blocks, a campus, or the like. For example, WAP 104 and CPE 110 may implement a radio technology such as IEEE 602.11 to establish a wireless local area network (WLAN). CPE 110 may include a third network interface (e.g., transceiver 209 in FIG. 2A) that enables CPE 110 to establish a third network connection with WAP 104 by air interface 107, thereby gaining access to data network 101 via the third network (e.g., Wi-Fi over WLAN).

Base station 103 and WAP 104 are shown in FIG. 1A as two separate entities for illustrative purposes only. As discussed below in reference to FIG. 6, base station 103 may implement one or more radio technologies and may include functionality attributed to WAP 104. While LTE and Wi-Fi communications are shown as examples, the disclosure is applicable to any type of wireless communication network, including, not limited to, third generation (3G), fourth generation (4G), and fifth generation (5G) wireless communication networks.

Figure 1B:
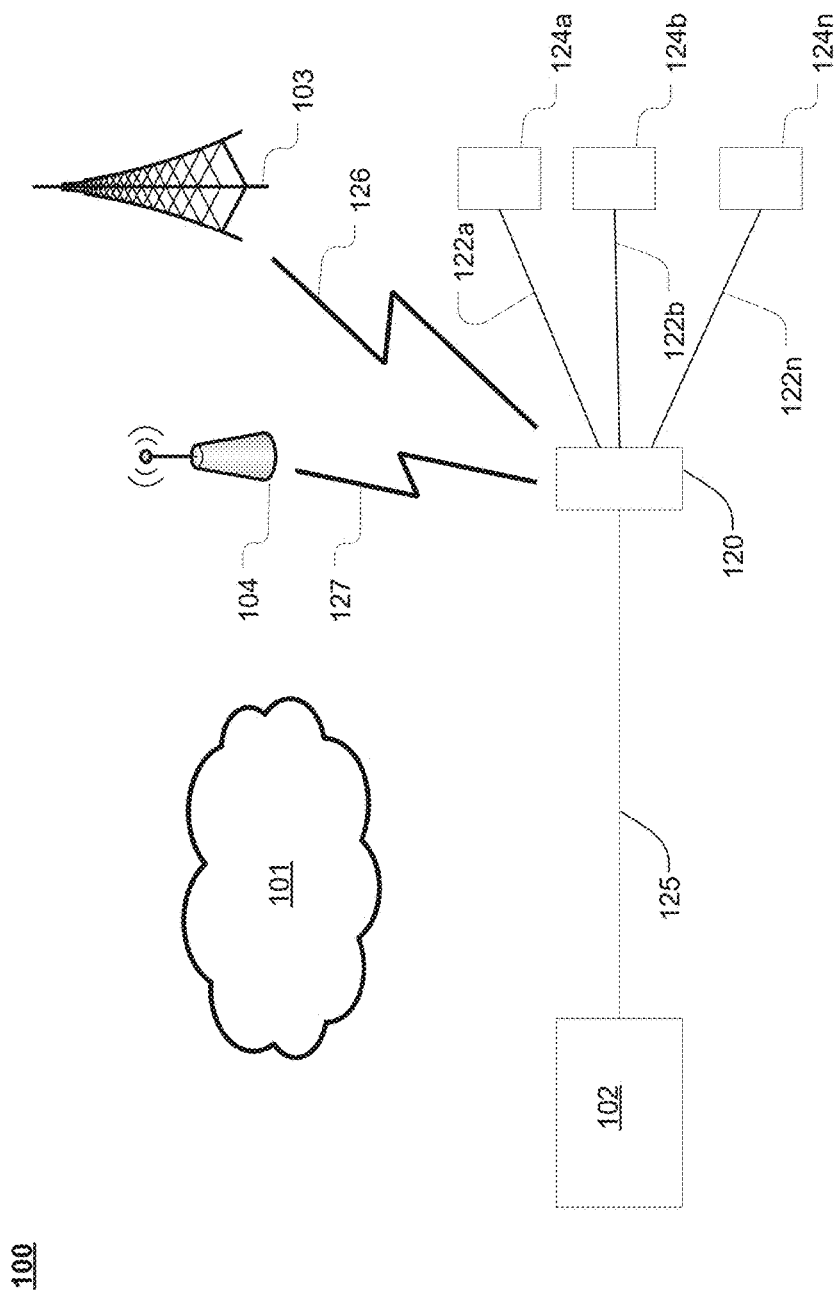
FIG. 1B illustrates an exemplary system according to another aspect of the disclosure.

In another aspect, the gateway apparatus 200 is envisioned to comprise a neighborhood gateway 120 that serves one or more residences. The neighborhood gateway 120 may allow for boosting bandwidth at multiple residential units without the need to upgrade the customer premises equipment at each residence. In addition, the neighborhood gateway 120 may also accommodate a more robust second network interface (e.g., stronger transceiver 209/antenna 210 in FIG. 2A) and greater bandwidth aggregation capabilities (e.g., faster processor 202, greater memory 204, faster input output system 206 and communication connection 208 in FIG. 2A). FIG. 1B illustrates another example of system 100 comprising a data network 100 (e.g., Internet), CO 102, base station 103, WAP 104, neighborhood gateway 120, and a plurality of CPEs 124a, 124b, 124n, which may be located in multiple residential units. CO 102, base station 103, and WAP 104 may be independently connected (connections not shown) to data network 101 to create a first network (e.g., DSL service), a second network (e.g., LTE mobility network), and a third network (e.g., Wi-Fi), respectively. In addition, neighborhood gateway 120 may be independently connected to CO 102, base station 103, and WAP 104, which may allow neighborhood gateway 120 to gain access to data network 101 via the first network, the second network, and for third network, respectively. For example, CO 102 may be connected to neighborhood gateway 120 by a wireline. An exemplary wireline connection may include DSL service. For example, neighborhood gateway 120 may be a standalone network component, such that CO 102 connects directly to neighborhood gateway 120 via communication link 125. In another example, neighborhood gateway 120 may be co-located with or integrated into an SAI (not shown) (e.g., DSLAM) and connected to CO 102 via communication link 125. In one scenario, communication link 125 is a copper wire. In another scenario, communication link 125 is a fiber-optic cable. In either example, neighborhood gateway 120 may include a first network interface for a wireline connection (e.g., communication connection 208 in FIG. 2A) that enables neighborhood gateway 120 to establish a first network wireline connection with CO 102, thereby gaining access to data network 101 via the first network (e.g., DSL service). The first network wireline connection may provide neighborhood gateway 120 a first network bandwidth for accessing data network 101.

Continuing with FIG. 1B base station 103 and WAP 104 may implement RAT to communicate with network Gateway 120 over air interfaces 126 and 127, respectively. For example, base station 103 may implement a radio technology such as E-UTRA, which may establish air interface 126 using LTE or LTE-A. Neighborhood gateway 120 may include a second network interface (e.g., transceiver 209 in FIG. 2A) that enables neighborhood gateway 120 to establish a second network connection with base station 103 by air interface 126, thereby gaining access to data network 101 via the second network (e.g., LTE mobility network). In addition, WAP 104 may implement any suitable RAT for facilitating wireless connectivity in a localized area, such as a place of business, a few city blocks, a campus, or the like. For example, WAP 104 and network Gateway 120 may implement a radio technology such as IEEE 602.11 to establish a wireless local area network (WLAN). Neighborhood gateway 120 may include a third network interface (e.g., transceiver 209 in FIG. 2A) that enables neighborhood gateway 120 to establish a third network connection with WAP 104 by air interface 127, thereby gaining access to data network 101 via the third network (e.g., Wi-Fi over WLAN).

Neighborhood gateway 120 may also be connected to the plurality of CPEs 124a, 124b, 124n via communication links 122a, 122b, 122n. Communication links 122a, 122b, 122n may comprise a copper line. In an example, neighborhood gateway 120 may provide each of the plurality of CPEs 124a, 124b, 124n a dedicated portion of the first network bandwidth via the communication links 122a, 122b, 122n (e.g., DSL service). Neighborhood gateway 120 may monitor the individual or collective desired bandwidth for the plurality of CPEs 124a, 124b, 124n and may dynamically enhance the first network bandwidth with bandwidth available in the second network (e.g., LTE mobility network) and bandwidth available in the third network (e.g., Wi-Fi over WLAN) based on user bandwidth need and second and third network bandwidth availability.

FIG. 2A is a block diagram of gateway device 200 that may be used in connection with system 100 for dynamically enhancing a first network bandwidth with bandwidth available in one or more other networks based on user bandwidth needs and network bandwidth availability. Gateway device 200 may comprise hardware or a combination of hardware and software. Gateway device 200 may comprise a processor 202 and a memory 204 coupled to processor 202. Memory 204 may contain executable instructions that, when executed by processor 202, cause processor 202 to effectuate operations associated with dynamically enhancing a first network bandwidth with bandwidth available in one or more other networks. As evident from the description herein, gateway device 200 is not to be construed as software per se.

In addition to processor 202 and memory 204, gateway device 200 may include an input/output system 206. Processor 202, memory 204, and input/output system 206 may be coupled together (coupling not shown in FIG. 2A) to allow communications between them. Each portion of gateway device 200 may comprise circuitry for performing functions associated with each respective portion. Thus, each portion may comprise hardware, or a combination of hardware and software. Accordingly, each portion of gateway device 200 is not to be construed as software per se. Input/output system 206 may be capable of receiving or providing information from or to a communications device or other network entities configured for telecommunications. For example input/output system 206 may include a wireless communications (e.g., 3G/4G/GPS) card. Input/output system 206 may be capable of receiving or sending video information, audio information, control information, image information, data, or any combination thereof. Input/output system 206 may be capable of transferring information with gateway device 200. In various configurations, input/output system 206 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 206 may comprise a Wi-Fi router for connecting with user devices.

Input/output system 206 of gateway device 200 also may contain a communication connection 208 that allows gateway device 200 to communicate with other devices, network entities, or the like. Communication connection 208 may comprise one or more network interfaces (e.g., local area network (LAN) card). Communication connection 208 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media.

Input/output system 206 of gateway device 200 may also include a transceiver 209 and antenna 210 that may allow gateway device 200 to communicate with other devices, network entities, or the like. The processor 202 may be coupled to the transceiver 209, which may be coupled to the antenna 210. While FIG. 2A depicts the processor 202 and the transceiver 209 as separate components, it will be appreciated that processor 202 and the transceiver 209 may be integrated together in an electronic package or chip. The antenna 210 may be configured to transmit signals to, or receive signals from, a wireless access point 104, base station 103, or the like. In addition, although antenna 210 is depicted in FIG. 2A as a single element, the gateway device 200 may include any number of transmit/receive elements 210. More specifically, the gateway device 200 may employ multiple-input multiple-output (MIMO) technology. Thus, in an example, the gateway device 200 may include two or more transmit/receive elements 210 (e.g., multiple antennas) for transmitting and receiving wireless signals. The transceiver 209 may be configured to modulate the signals that are to be transmitted by the transmit/receive element 210. As noted above, the gateway device 200 may have multimode capabilities. Thus, the transceiver 209 may include multiple transceivers and may comprise one or more network interfaces for enabling the gateway device 200 to communicate via multiple radio technologies.

Processor 202 may be capable of performing functions associated with telecommunications, such as functions associated with dynamically enhancing a first network bandwidth with bandwidth available in one or more other networks based on user bandwidth needs and bandwidth network availability, as described herein. For example, processor 202 may be capable of, in conjunction with any other portion of gateway device 200, monitoring a desired bandwidth, determining the desired bandwidth is greater than a first threshold bandwidth, activating a connection to a second network, deriving a second network available bandwidth, and using the first network bandwidth and at least a portion of the second network available bandwidth to provide at least a portion of the desired bandwidth.

Memory 204 of gateway device 200 may comprise a storage medium having a concrete, tangible, physical structure. As is known, a signal does not have a concrete, tangible, physical structure. Memory 204, as well as any computer-readable storage medium described herein, is not to be construed as a signal. Memory 204, as well as any computer-readable storage medium described herein, is not to be construed as a transient signal. Memory 204, as well as any computer-readable storage medium described herein, is not to be construed as a propagating signal. Memory 204, as well as any computer-readable storage medium described herein, is to be construed as an article of manufacture.

Memory 204 may store any information utilized in conjunction with telecommunications. Depending upon the exact configuration or type of processor, memory 204 may include a volatile storage (such as some types of RAM), a nonvolatile storage (such as ROM, flash memory), or a combination thereof. Memory 204 may include additional storage (e.g., a removable storage or a non-removable storage) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by gateway device 200. Memory 204 may comprise executable instructions that, when executed by processor 202, cause processor 202 to effectuate operations to dynamically enhance a first network bandwidth with bandwidth available in one or more other networks based on user bandwidth needs and network bandwidth availability.

Figure 2B:
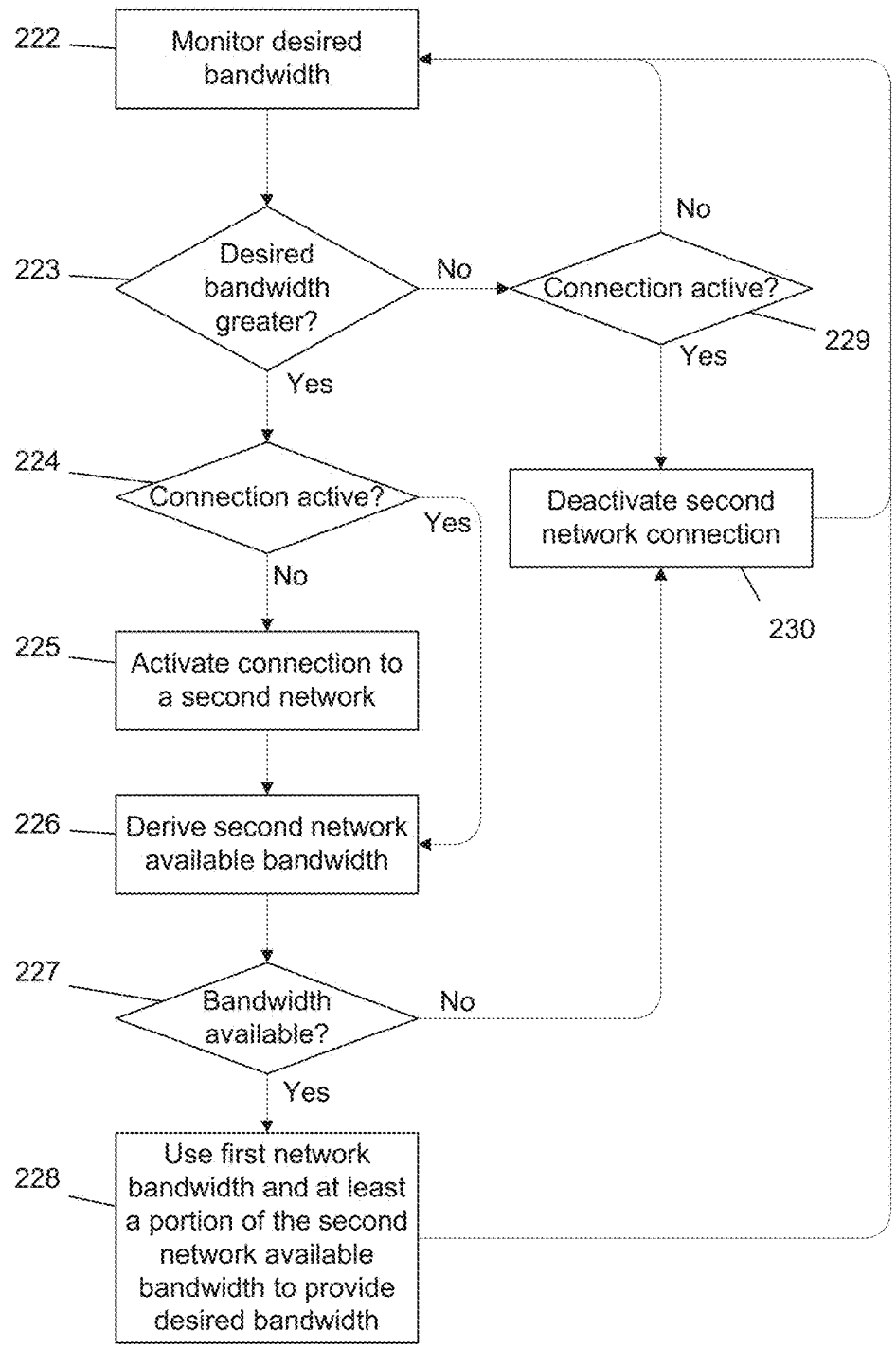
FIG. 2B illustrates an exemplary method for dynamically enhancing a first network bandwidth with bandwidth available in one or more other networks based on user bandwidth needs and network bandwidth availability.

FIG. 2B illustrates an exemplary method for implementing gateway apparatus 200 in system 100. In an aspect, at step 222, gateway apparatus 200 may monitor the user's desired bandwidth (e.g., the user's bandwidth needs). For example, gateway apparatus 200 may monitor the user's bandwidth consumption. By way of example, gateway apparatus 200 may monitor the first network on the application layer, continuously registering the amount of data being transferred in a certain amount of time. When downloading large amounts of data, time is the contributing factor to determine the data speed. The more time needed to download the data, the more bandwidth is required. Monitoring the application layer may also allow the gateway apparatus 200 to see what type of data is being requested (e.g., text, email, video, etc.). As discussed below, if the gateway apparatus 200 detects that a large amount of data is being requested, it may determine that additional bandwidth will be required.

At step 223, gateway apparatus 200 may evaluate the user's desired bandwidth with a first threshold bandwidth. For example, the first threshold bandwidth may be a first network bandwidth. In another example, the first threshold bandwidth may be a base guaranteed bandwidth (e.g., a DSL service that guarantees a 1.5 Mbps base bandwidth, but may provide greater bandwidth depending on line conditions). In a low bandwidth consumption scenario (e.g., web browsing, emailing, or the like), gateway apparatus 200 may determine that the desired bandwidth is less than the first network bandwidth. In such a scenario, the first network bandwidth is sufficient to satisfy the user's bandwidth needs. At step 229, gateway apparatus 200 may determine that the second network connection is not active and return to steps 222 and 223 to monitor and evaluate the user's desired bandwidth.

In a high bandwidth consumption scenario (e.g., online gaming, video chat, streaming video, or the like), at step 223, gateway apparatus 200 may detect the need for increased bandwidth (e.g., determine that the user's desired bandwidth is greater than the first network bandwidth). At step 224, gateway apparatus 200 may check to determine whether the connection to the second network is active. If the second network connection is not active, at step 225, gateway apparatus 200 may activate the second network interface (e.g., transceiver 209) and connect to the second network. At step 226, the gateway apparatus 200 may derive the second network available bandwidth. In an example, gateway 200 may transmit information to the second network indicating that it requires second network resources. The second network may determine what resources are available in the second network to allocate to the gateway apparatus 200. At this point, the second network may consider factors including, but not limited to, the second network capacity, the amount of data or bandwidth requested by gateway apparatus 200, priority (e.g., number of critical time-sensitive packets), and channel conditions. The second network may then transmit information to gateway apparatus 200 indicating the amount of available resources (e.g., bandwidth available in the second network).

At step 227, gateway apparatus 200 may determine that the second network does not have available bandwidth to be used. For example, at step 226, gateway apparatus 200 may receive information indicating that the second network does not have available resources (e.g., bandwidth). In another example, gateway apparatus 200 may have a second network threshold value defining a lower limit that must be exceeded before the gateway apparatus 200 is permitted to utilize second network resources. In a first scenario, the second network threshold value may be a percentage of the second network capacity (e.g., 5%, 10%, 25%, or the like). In a second scenario, the second network threshold value may be a predetermined amount of network resources (e.g., 5 Mbps, 10 Mbps, 25 Mbps of second network bandwidth, or the like). At step 227, gateway apparatus 200 may evaluate the derived available second network bandwidth and the second network threshold value to determine whether the second network has available bandwidth to be used (e.g., derived available second network bandwidth is greater than the second network threshold value).

If the second network does not have available bandwidth to be used, at step 230, gateway apparatus 200 may deactivate the second network connection. The gateway apparatus 200 may then repeat steps 222 through 227 to monitor and evaluate the user desired bandwidth, connect to the second network, and derive and evaluate the second network bandwidth availability. In another example, gateway apparatus 200 may include a timer that only permits gateway apparatus 200 to periodically (e.g., every 30 seconds, 1 minute (min.), 5 min., etc.) activate a connection to the second network and derive second network available bandwidth. In another example, gateway apparatus 200 may activate a third network interface (e.g., transceiver 209) and connect to a third network. The gateway apparatus 200 may derive the third network available bandwidth and, if the third network has available bandwidth, gateway apparatus 200 may use the first network bandwidth and at least a portion of the third network available bandwidth to provide the desired bandwidth.

If the second network has available bandwidth to be used, at step 228, the gateway apparatus 200 may use the first network bandwidth and at least a portion of the second network available bandwidth to provide the user the desired bandwidth. By way of example, gateway apparatus 200 may aggregate the first network bandwidth with at least a portion of the second network bandwidth to provide the user the desired bandwidth. At steps 222 and 223, the gateway apparatus 200 may continue to monitor and evaluate the user's desired bandwidth, and at steps 226 and 227, the gateway apparatus 200 may continue to derive and evaluate the second network available bandwidth. Based on the user's desired bandwidth and the bandwidth available in the second network, at step 228, gateway apparatus 200 may dynamically adjust the portion of available second network bandwidth that is used with the first network bandwidth. For example, gateway apparatus 200 may determine that the second network available bandwidth has decreased and, therefore, may reduce the amount of second network bandwidth that is used with the first network bandwidth to provide at least a portion of the desired bandwidth. In another example, gateway apparatus 200 may determine that the second network available bandwidth has fallen below the second network threshold value and, at step 230, may deactivate the connection to the second network. In another example, the user's desired bandwidth may decrease but still be greater than the first network bandwidth. In such a case, gateway apparatus 200 may, therefore, reduce the amount of second network bandwidth that used with the first network bandwidth to provide the desired bandwidth.

At step 223, gateway apparatus 200 may determine that the user's desired bandwidth has fallen below the first threshold bandwidth. At step 229, the gateway apparatus 200 may identify that the second network connection is active and, at step 230, it may deactivate the second network interface (e.g., transceiver 209). Gateway apparatus 200 may then return to steps 222 and 223 to monitor and evaluate the user's desired bandwidth.

In an aspect, gateway apparatus 200 may include a data buffer (e.g., memory 204 in FIG. 2A). The data buffer may allow for more efficient usage of the second network available bandwidth. For example, the data buffer may allow the gateway apparatus 200 to use a larger portion of the second network available bandwidth for a shorter duration of time. The data buffer may also allow gateway apparatus 200 to maintain a set second network bandwidth. In addition, the data buffer may allow the gateway apparatus 200 to cap the maximum second network bandwidth consumption. By way of an example, a user with 2 Mbps first network bandwidth may desire to stream a movie that requires a data speed of 6 Mbps to display the proper video quality (e.g., HD video). At step 226, gateway apparatus 200 may derive that the second network has 30 Mbps of bandwidth available. In this scenario, the second network threshold value is 10 Mbps. At step 227, gateway apparatus 200 may therefore determine that the second network has 20 Mbps of available bandwidth that may be used, which is more than the 4 Mbps needed to fulfill the 6 Mbps desired bandwidth. At step 228, gateway apparatus 200 may aggregate the 20 Mbps of available second network bandwidth with the 2 Mbps first network bandwidth to allow gateway apparatus 200 to download and temporarily store video and audio data in the data buffer. The gateway apparatus 200 may then transfer the video and audio data from the data buffer to the user at an appropriate data speed to display the movie at the desired video quality (e.g., the 6 Mbps). In another example, the gateway apparatus 200 may utilize only the second network (e.g., the 20 Mbps of available second network bandwidth) to download and temporarily store data (e.g., the movie video and audio data) in the buffer. The gateway apparatus 200 may then transfer the data from the data buffer to the user at the appropriate data speed. In this example, the gateway apparatus 200 may utilize the first network bandwidth (e.g., 2 Mbps) for other user bandwidth needs (e.g., surfing the Internet, checking email, or the like).

In an example, with reference to FIGS. 1A, 2A, and 2B, gateway apparatus 200 may comprise CPE 110. CO 102, base station 103, and WAP 104 may be independently connected (connections not shown) to data network 101 to create a first network (e.g., DSL service), a second network (e.g., LTE mobility network), and a third network (e.g., Wi-Fi), respectively. CPE 110 may include a first network interface, communication connection 208, which enables CPE 110 to establish a DSL network wireline connection with CO 102 via copper line 105, SAI 108, and copper line 109. The DSL network wireline connection may provide CPE 110 a first network bandwidth for accessing data network 101. For example, the user may have DSL service that provides a base bandwidth of 2 Mbps. At step 222, CPE 110 may monitor the user's desired bandwidth. At step 223, CPE 110 may detect the need for increased data speeds (e.g., determine that the user's desired bandwidth is greater than the DSL network 2 Mbps bandwidth). For example, the user may wish to stream an HD video that consumes 6 Mbps of bandwidth. At step 224, CPE 110 may determine that the LTE mobility network connection is not active and, at step 225, CPE 110 may activate transceiver 209 to establish a network connection with base station 103 by air interface 106. At step 226, CPE 110 may derive the LTE mobility network available bandwidth. At step 227, CPE 110 may determine that the LTE mobility network available bandwidth is greater than an LTE mobility network threshold value. As such, CPE 110 may avoid negatively impacting the LTE mobility network by only using the LTE mobility network connection (e.g., air interface 106) to transfer data if the LTE mobility network has sufficient available bandwidth. At step 228, CPE 110 may use the 2 Mbps DSL network bandwidth and 4 Mbps of the LTE mobility network available bandwidth to provide sufficient bandwidth for the user to view the desired HD video. At steps 222 and 223 CPE 110 may continue to monitor and evaluate the user's desired bandwidth. At steps 226 and 227, CPE 110 may continue to derive and evaluate the LTE mobility network available bandwidth. At step 228, CPE 110 may dynamically adjust the amount and speed of data transferred via the LTE mobility network connection (e.g., air interface 106) based on the desired bandwidth and the LTE mobility network available bandwidth to ensure a minimal impact on the LTE mobility network. In addition, the CPE 110 may continue to monitor the desired bandwidth (e.g., the user's data usage), and at step 223, when CPE 110 determines that the desired bandwidth falls below the 2 Mbps base DSL bandwidth, CPE 110 may deactivate the LTE mobility network interface (e.g., transceiver 209) and provide the user bandwidth from only the DSL service. Thus, the CPE 110 may allow for enhancing a user's base DSL bandwidth without interfering with service the LTE mobility network provides to other users.

Referring to the high bandwidth consumption example above, CPE 110 may use the 2 Mbps DSL network bandwidth and 4 Mbps of the LTE mobility network available bandwidth to satisfy the user's desired bandwidth of 6 Mbps. At step 222, CPE 110 may detect an increase in desired bandwidth. For example, additional users at the residence may start streaming HD videos or playing an online game that increases the desired bandwidth from 6 Mbps to 20 Mbps. At steps 226 and 227, CPE 110 may derive and determine that the LTE mobility network only has 16 Mbps of the desired 18 Mbps additional bandwidth available. In a first scenario, at step 228, CPE 110 may use the 2 Mbps bandwidth from the DSL service and the 16 Mbps bandwidth available in the LTE mobility network to provide the user 18 Mbps of bandwidth. While this is less than the desired 20 Mbps bandwidth, it is an improvement over the base 2 Mbps DSL service bandwidth.

In a second scenario where CPE 110 is able to access a third network (e.g., Wi-Fi), CPE 110 may activate transceiver 209 to establish a network connection with WAP 104 by air interface 107. CPE 110 may then derive the Wi-Fi network available bandwidth and determine that the Wi-Fi network has available bandwidth that may be used. CPE 110 may then use 2 Mbps of available Wi-Fi network bandwidth with the 16 Mbps LTE mobility network bandwidth and the 2 Mbps DSL network bandwidth to provide the user the full 20 Mbps desired bandwidth. CPE 110 may then continue to continue to monitor the desired bandwidth and to derive and determine LTE mobility network and Wi-Fi network bandwidth availability. Based on user need and network availability, CPE 110 may dynamically adjust the portions of available bandwidth from the LTE mobility network and the Wi-Fi network that are used with the DSL network bandwidth. For example, if CPE 110 determines that the desired bandwidth is less than a bandwidth comprising the combined bandwidth of the 2 Mbps DSL network bandwidth and the portion of available LTE mobility network bandwidth allocated to CPE 110 (e.g., 16 Mbps), CPE 110 may deactivate the Wi-Fi network interface (e.g., transceiver 209). CPE 110 may then continue to monitor the desired bandwidth, derive the LTE mobility network available bandwidth and dynamically adjust the portion of available LTE mobility network available bandwidth that is used with the DSL network bandwidth to provide the desired bandwidth.

While descriptions and examples provided above have discussed three networks, it is envisioned that the invention is not limited to only three networks. Gateway apparatus 200 may have any number of network connections. In addition, gateway apparatus 200 may connect to multiple networks of the same type (e.g., connect to two different Wi-Fi networks).

Figure 3:
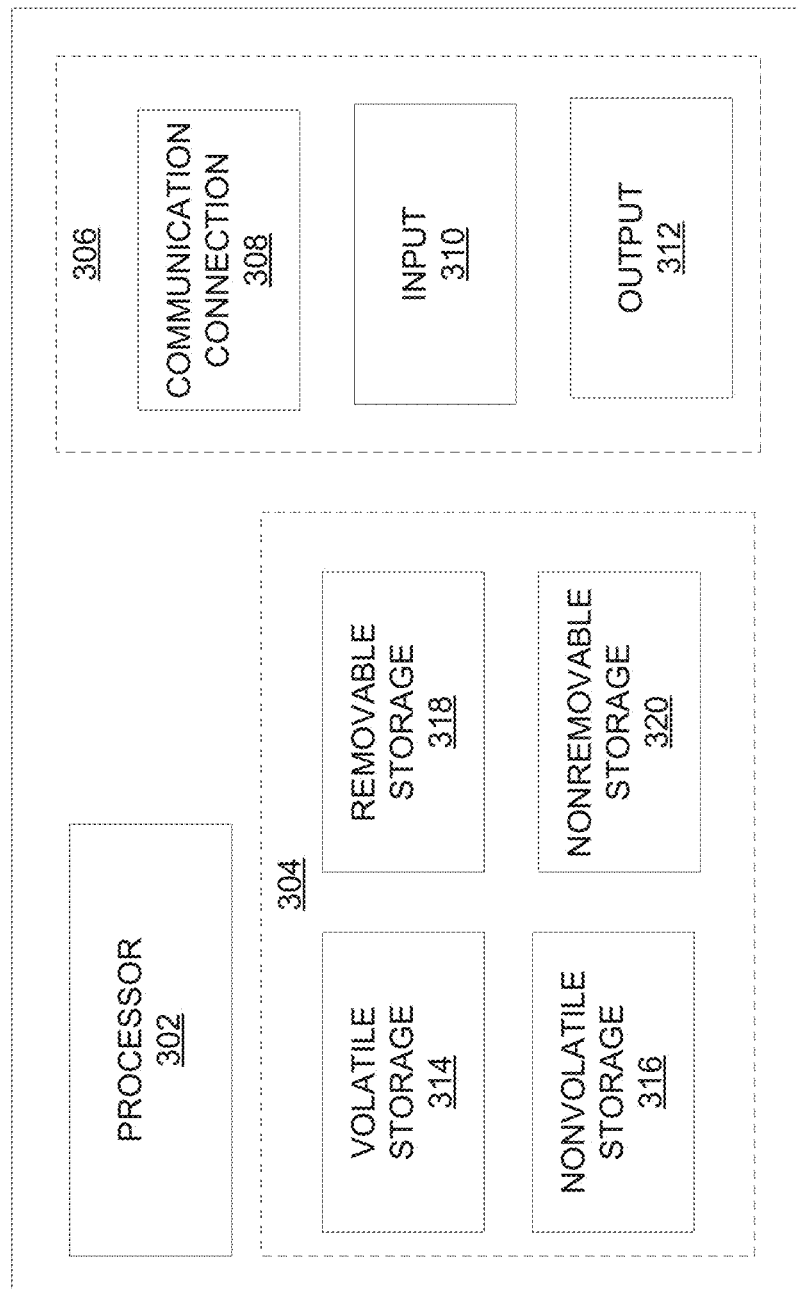
FIG. 3 illustrates a schematic of an exemplary network device.

FIG. 3 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
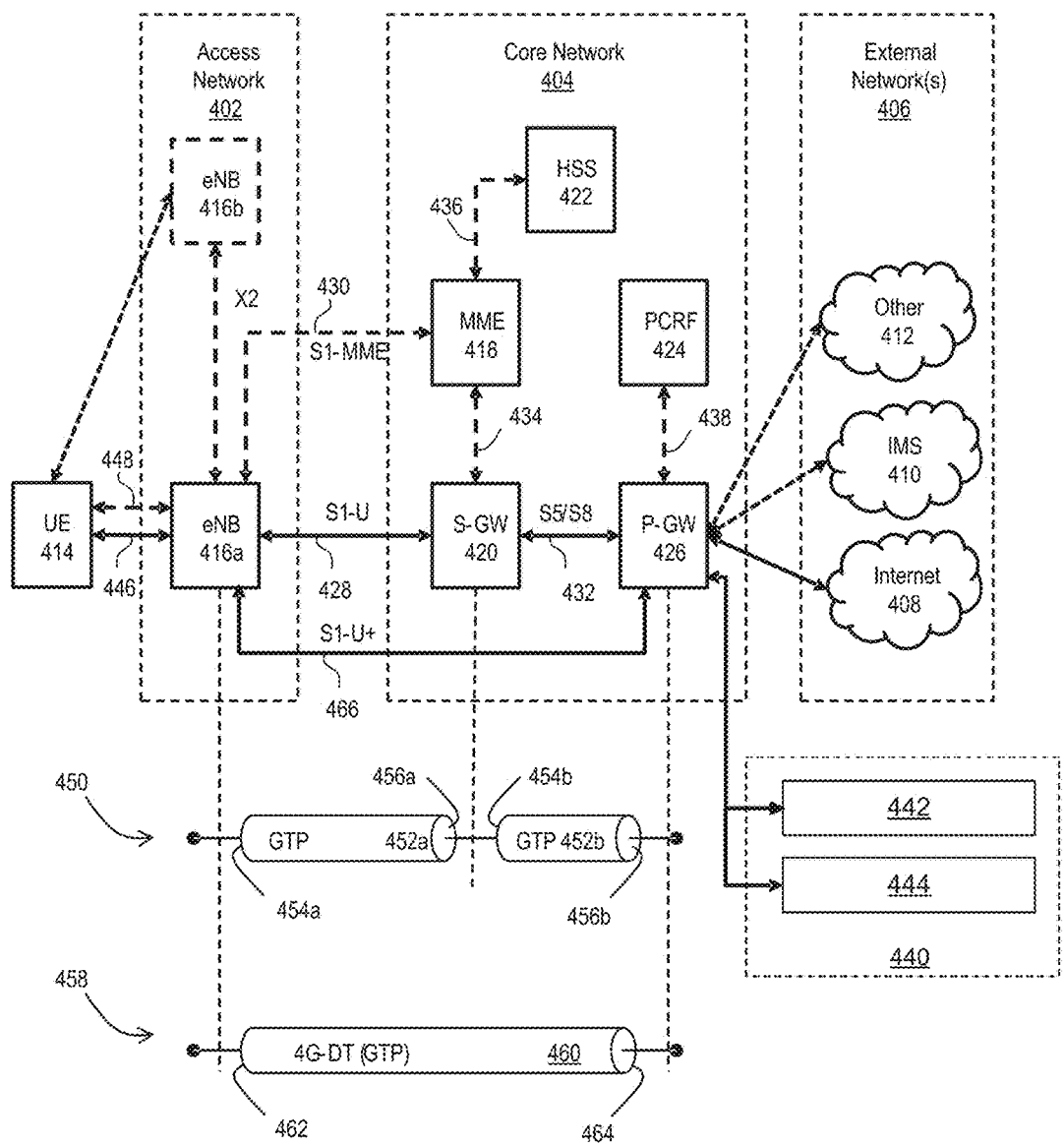
FIG. 4 illustrates an exemplary communication system that provides wireless telecommunication services over wireless communication networks.

FIG. 4 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416*a*.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416*a* and PGW 426. Notably, S1-U+ path/interface does not include SGW 420, a node that is otherwise instrumental in configuring and/or managing packet forwarding between eNB 416*a* and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
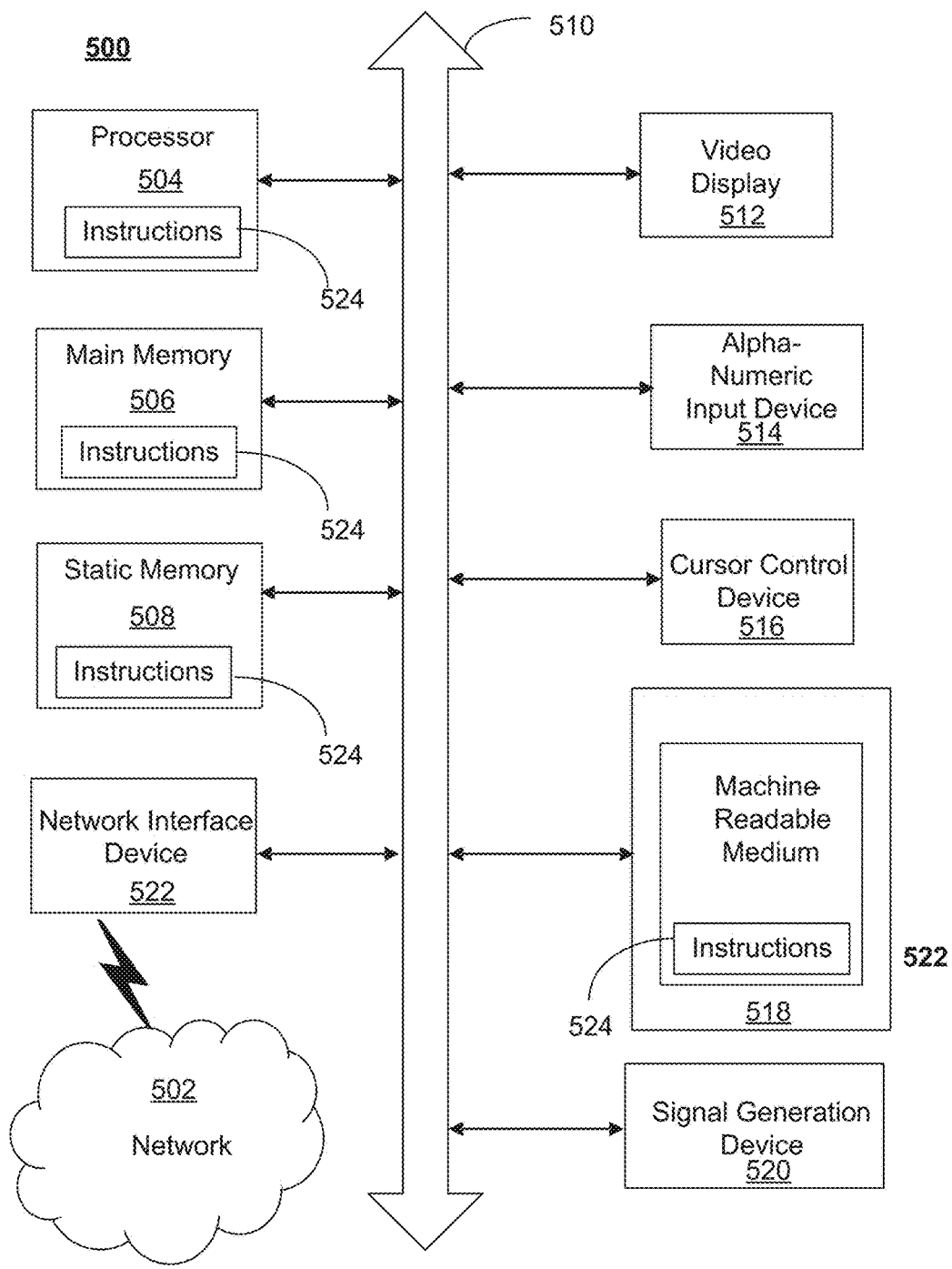
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods for dynamically enhancing a first network bandwidth with bandwidth available in one or more other networks based on user bandwidth needs and network bandwidth availability. One or more instances of the machine can operate, for example, as processor 202, 302, UE 414, eNB 416, MME 418, SGW 420, HSS 422, PCRF 424, PGW 426 and other devices of FIGS. 2A, 3, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
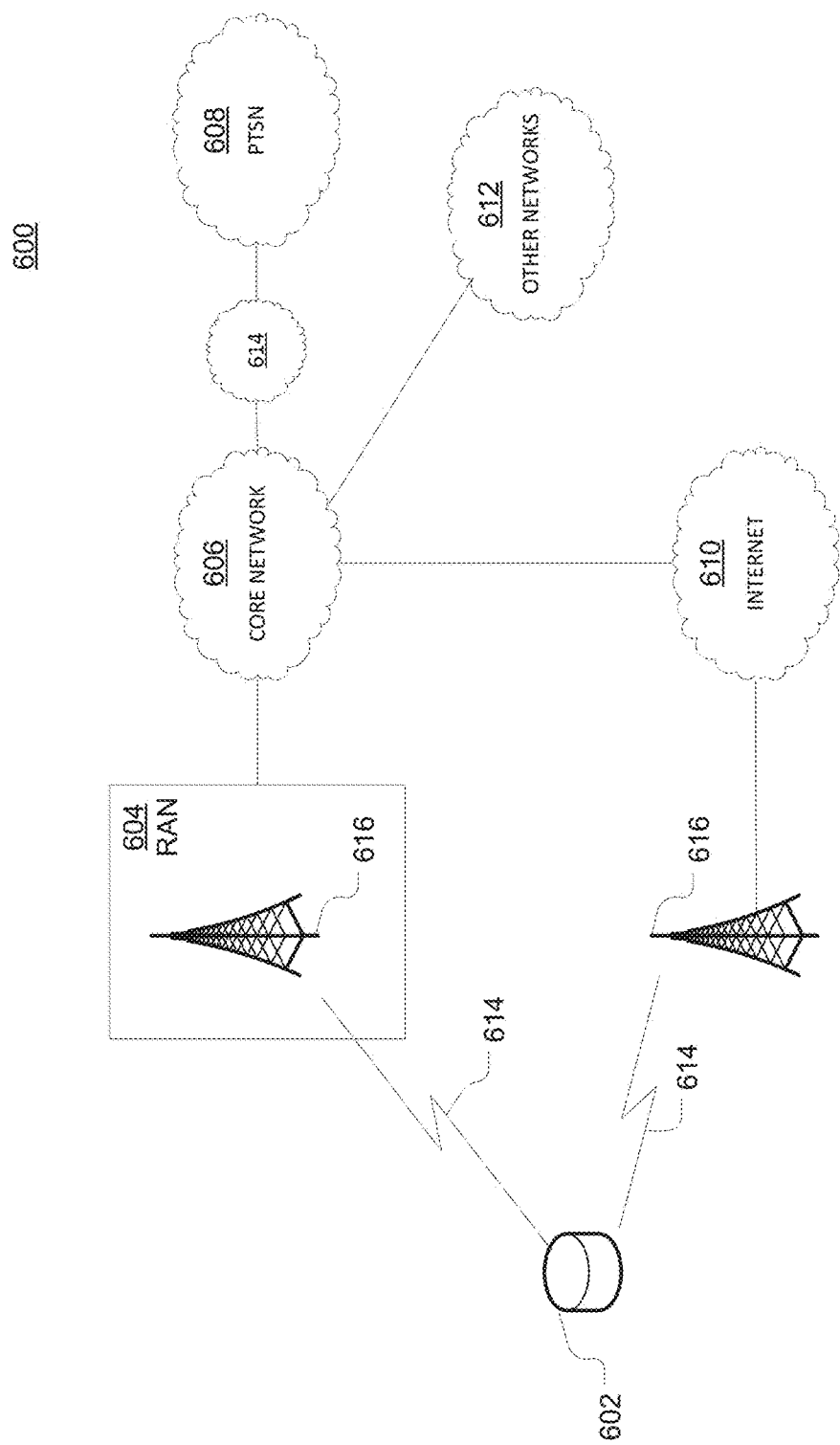
FIG. 6 illustrates an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise Ogateway apparatus 200, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multimode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
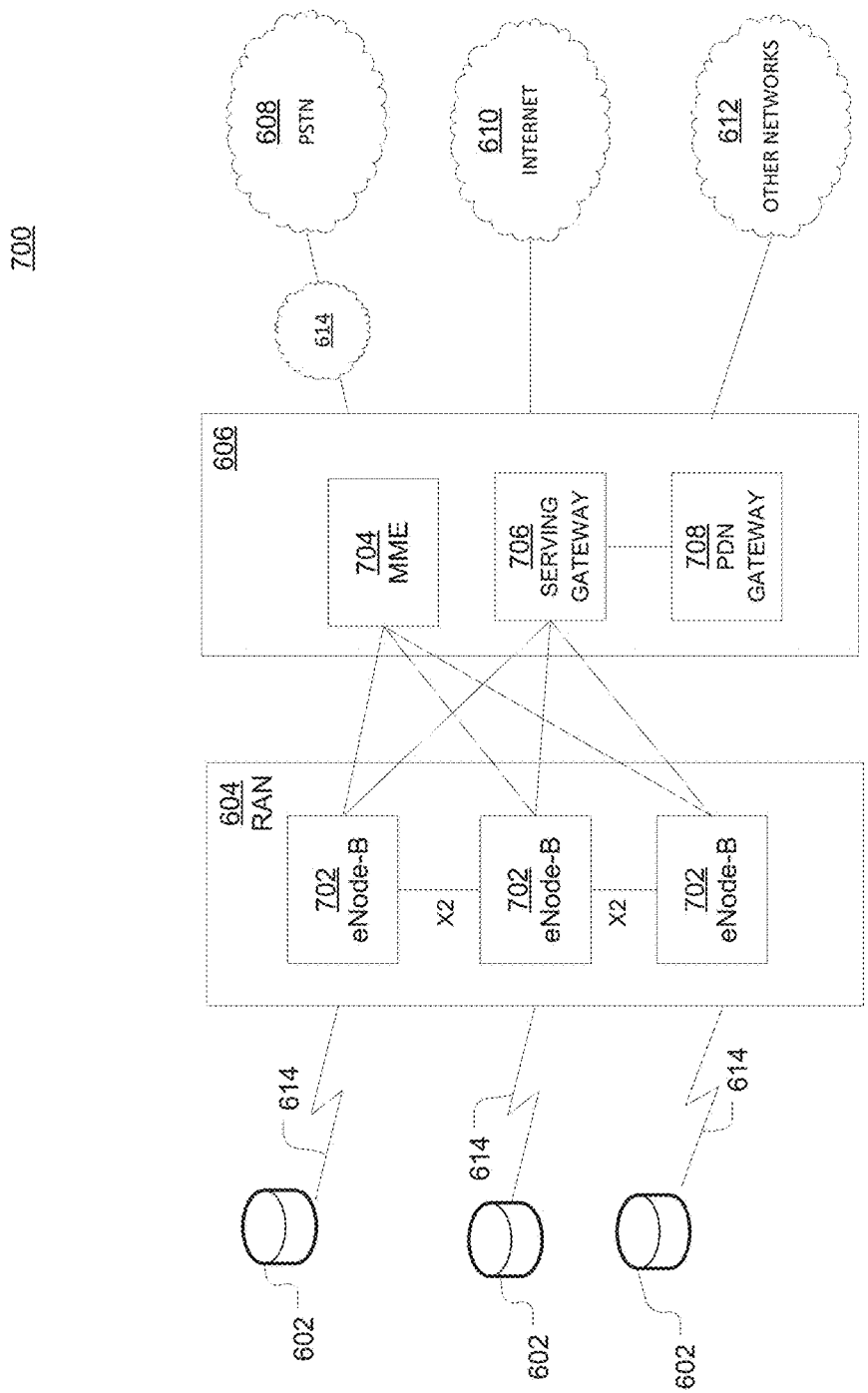
FIG. 7 illustrates an example system diagram of a radio access network and a core network.

FIG. 7 is an example system 400 including RAN 604 and core network 606 that may be utilized in connection with dynamically enhancing a first network bandwidth with bandwidth available in one or more other networks based on user bandwidth needs and network bandwidth availability. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
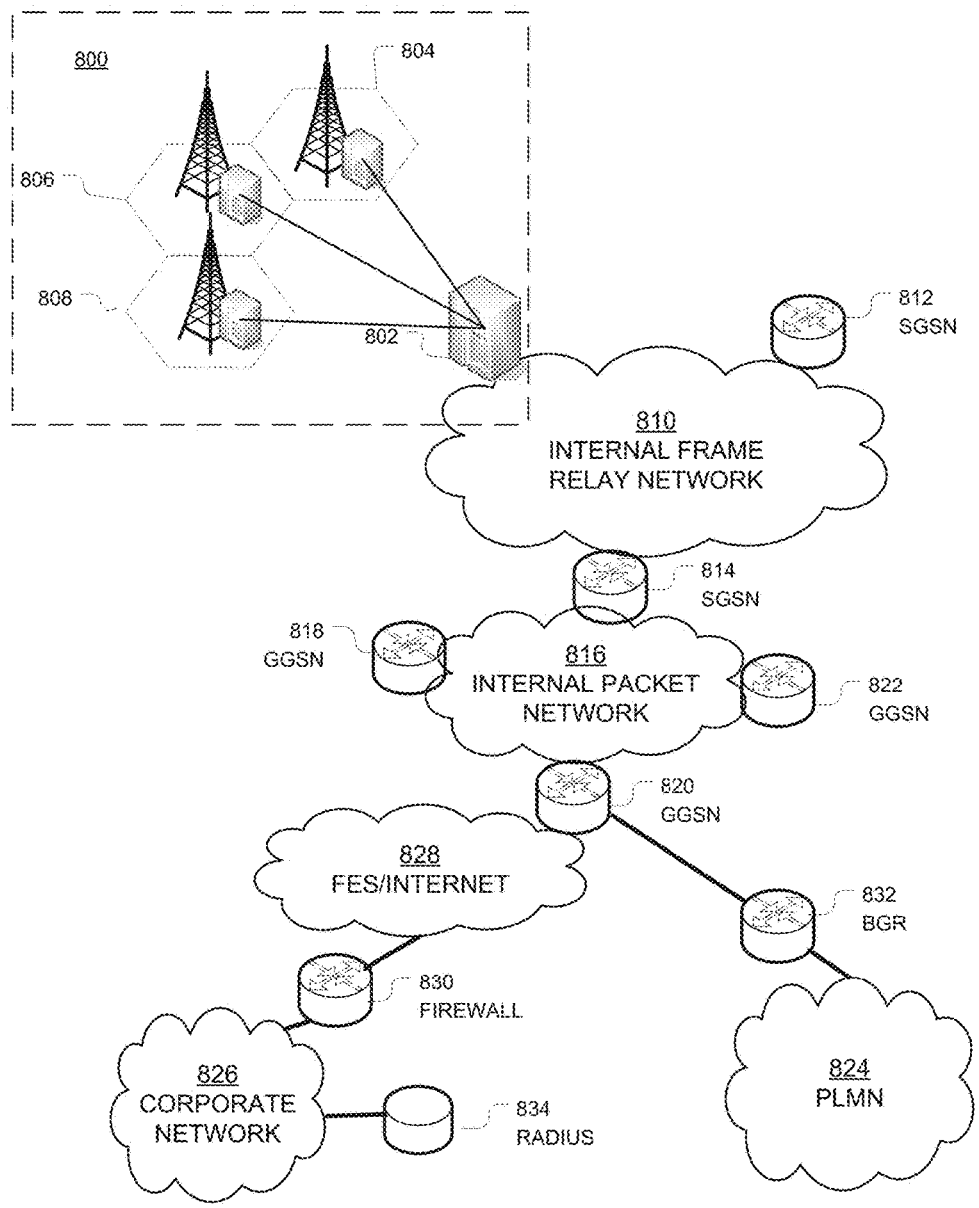
FIG. 8 depicts an overall block diagram of an example packet-based mobile cellular network environment, such as a general packet radio service (GPRS) network.

FIG. 8 depicts an overall block diagram of an example packet-based mobile cellular network environment, such as a GPRS network that may be utilized in connection with dynamically enhancing a first network bandwidth with bandwidth available in one or more other networks based on user bandwidth needs and network bandwidth availability. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
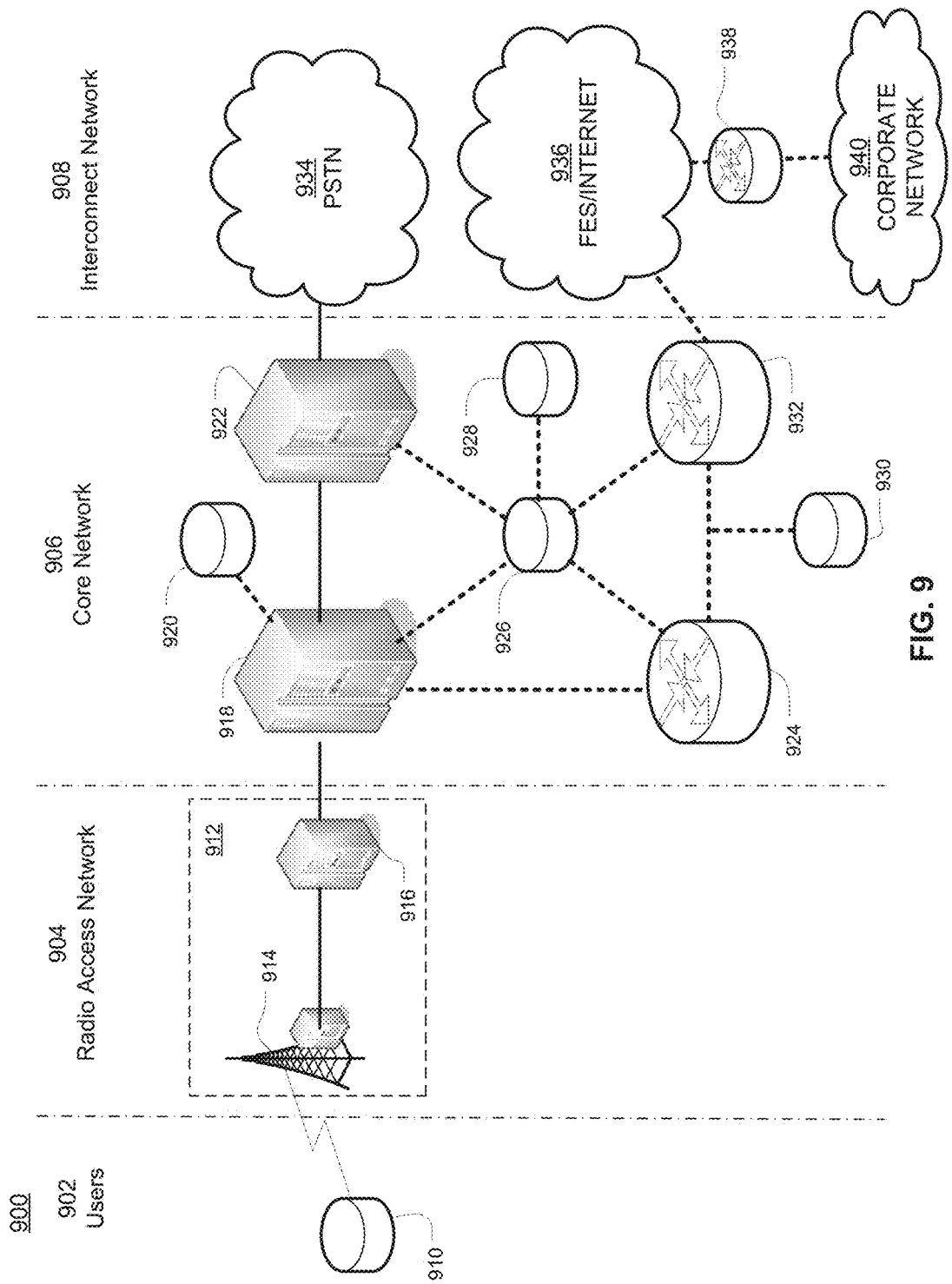
FIG. 9 illustrates an exemplary architecture of a GPRS network.

FIG. 9 illustrates an architecture of a typical GPRS network 900 that may be utilized in connection with dynamically enhancing a first network bandwidth with bandwidth available in one or more other networks based on user bandwidth needs and network bandwidth availability. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., gateway apparatus 200 network device 300, or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
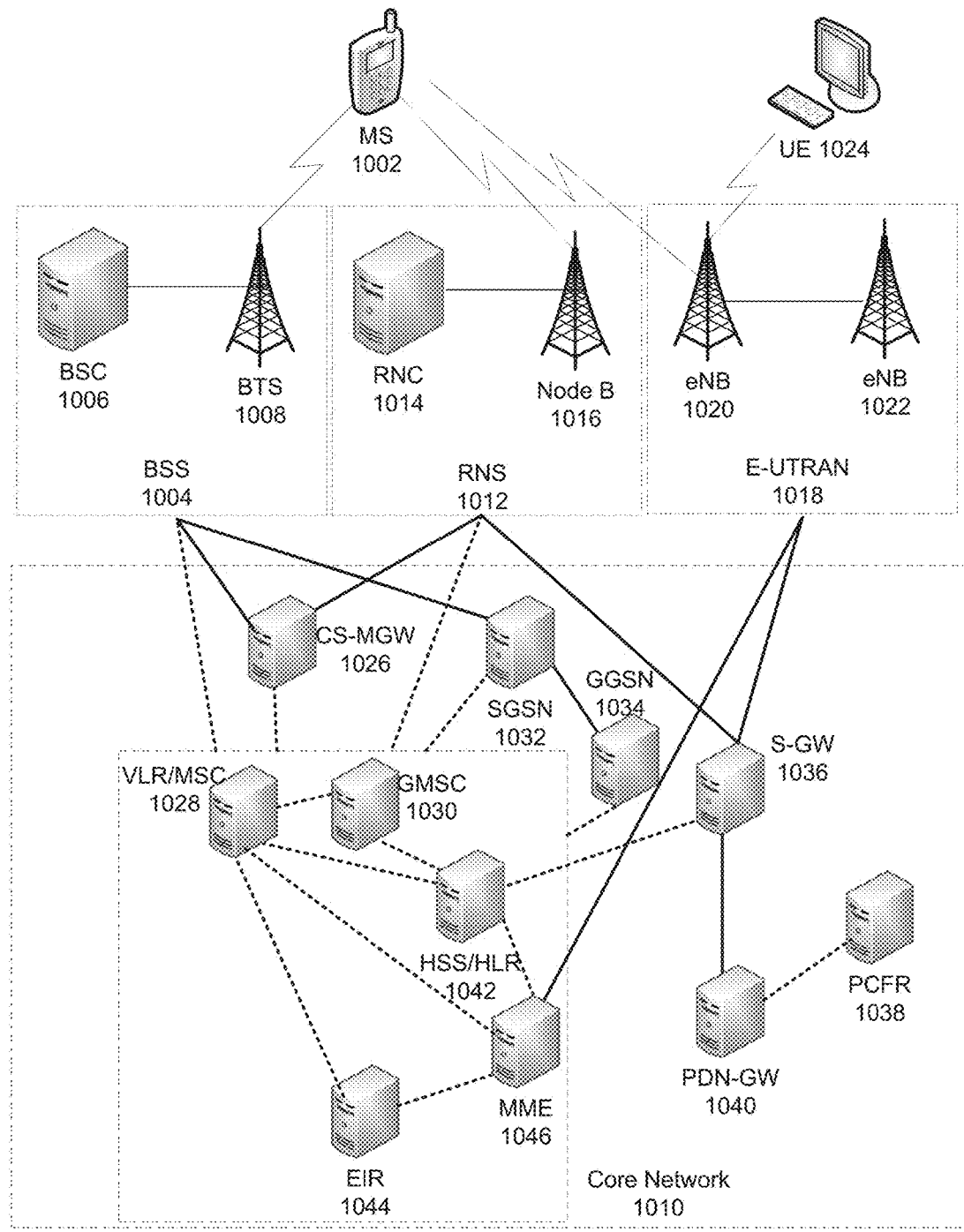
FIG. 10 is a block diagram of an exemplary public land mobile network (PLMN).

FIG. 10 illustrates a PLMN block diagram view of an example architecture of a telecommunications system that may be used by system 100 for dynamically enhancing a first network bandwidth with bandwidth available in one or more other networks based on user bandwidth needs and network bandwidth availability. In FIG. 10, solid lines may represent user traffic signals, and dashed lines may represent support signaling. MS 1002 is the physical equipment used by the PLMN subscriber. For example, gateway apparatus 200, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from PGW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which a first network bandwidth may be dynamically enhanced with bandwidth available in one or more other networks based on user bandwidth needs and network bandwidth availability have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—dynamically enhancing a first network bandwidth with bandwidth available in one or more other networks based on user bandwidth needs and network bandwidth availability—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A method for dynamically enhancing a first network bandwidth, the method comprising:
    monitoring, by an apparatus, for a desired bandwidth;
    determining, by the apparatus, that the desired bandwidth is greater than a first threshold bandwidth;
    determining, by the apparatus, that a time period recorded by a timer is greater than a first threshold time;
    based on the desired bandwidth being greater than the first threshold bandwidth and based on the time period recorded by a timer is greater than the first threshold time, activating, by the apparatus, a connection to a second network;
    subsequent to connecting with the second network, deriving, by the apparatus, a second network available bandwidth; and
    based on the derived second network available bandwidth, using, by the apparatus, the first network bandwidth and at least a portion of the second network available bandwidth to provide at least a portion of the desired bandwidth.

2. The method of claim 1, wherein the first threshold bandwidth is the first network bandwidth.

3. The method of claim 1, wherein deriving the second network available bandwidth further comprises receiving, by the apparatus, information identifying the second network available bandwidth.

4. The method of claim 1, further comprising:
    dynamically adjusting, by the apparatus, the at least a portion of the second network available bandwidth, based on the desired bandwidth and the second network available bandwidth.

5. The method of claim 1, further comprising:
    determining, by the apparatus, that the desired bandwidth is less than the first threshold bandwidth; and
    deactivating, by the apparatus, the connection to the second network.

6. The method of claim 1, further comprising:
determining, by the apparatus, that the second network available bandwidth is less than a second network threshold value; and
deactivating, by the apparatus, the connection to the second network.

7. The method of claim 6, wherein the second network threshold value is a predetermined amount of second network resources.

8. The method of claim 1, wherein using the first network bandwidth and the at least a portion of the second network bandwidth further comprises downloading and storing data in a data buffer, and providing the at least a portion of the desired bandwidth further comprises transferring the data from the data buffer.

9. A gateway apparatus, comprising:
a processor; and
a memory coupled with the processor, the memory comprising executable instructions that when executed by the processor cause the processor to effectuate operations comprising:
monitoring for a desired bandwidth;
determining that the desired bandwidth is greater than a first threshold bandwidth;
determining that a time period recorded by a timer is greater than a first threshold time;
based on the desired bandwidth being greater than the first threshold bandwidth and based on the time period recorded by a timer is greater than the first threshold time, activating a connection to a second network;
subsequent to connecting with the second network, deriving a second network available bandwidth; and
using a first network bandwidth and at least a portion of the second network available bandwidth to provide at least a portion of the desired bandwidth.

10. The apparatus of claim 9, wherein the first threshold bandwidth is the first network bandwidth.

11. The apparatus of claim 9, further operations comprising:
dynamically adjusting the at least a portion of the second network available bandwidth, based on the desired bandwidth and the second network available bandwidth.

12. The apparatus of claim 9, further operations comprising:
determining that the first threshold bandwidth is greater than the desired bandwidth; and
deactivating the connection to the second network.

13. The apparatus of claim 9, further operations comprising:
determining that the second network available bandwidth is less than a second network threshold value; and
deactivating the connection to the second network.

14. The apparatus of claim 9, wherein using the first network bandwidth and the at least a portion of the second network bandwidth further comprises downloading and storing data in a data buffer, and providing the at least a portion of the desired bandwidth further comprises transferring the data from the data buffer.

15. The apparatus of claim 14, wherein the data is downloaded via the connection to the second network.

16. The apparatus of claim 9, further operations comprising:
activating a connection to a third network;
deriving a third network available bandwidth; and
using at least a portion of the third network available bandwidth with the first network bandwidth and the at least a portion of the second network available bandwidth to provide at least a portion of the desired bandwidth.

17. The apparatus of claim 16, wherein prior to the operation of activating the connection to the third network, further operations comprise determining that the desired bandwidth is greater than a combined bandwidth comprising the first network bandwidth and the at least a portion of the second network available bandwidth.

18. The apparatus of claim 16, further operations comprising:
determining that the third network available bandwidth is less than a third network threshold value; and
deactivating the connection to the third network.

19. The apparatus of claim 16, wherein using at least a portion of the third network available bandwidth further comprises downloading data via the connection to the third network and storing the data in a data buffer, and providing at least a portion of the desired bandwidth further comprises transferring data from the data buffer.

20. The apparatus of claim 16, further operations comprising:
determining that the desired bandwidth is less than a combined bandwidth comprising the first network bandwidth and the at least a portion of the second network bandwidth; and
deactivating the connection to the third network.

* * * * *